United States Patent [19]
Stoy

[11] 3,864,323
[45] Feb. 4, 1975

[54] METHOD OF MANUFACTURING POLYCOAGULANTS

[75] Inventor: Artur Stoy, Prague, Czechoslovakia

[73] Assignee: Ceskoslovenska akademie ved, Narodni, Prague, Czechoslovakia

[22] Filed: June 29, 1971

[21] Appl. No.: 158,103

[30] Foreign Application Priority Data
July 2, 1970 Czechoslovakia .................. 4627-70

[52] U.S. Cl. ............ 260/88.7 R, 210/54, 260/80.73, 260/88.7 B, 260/88.7 F
[51] Int. Cl. ....... C08f 3/76, C08f 15/02, C08f 27/14
[58] Field of Search ..... 260/88.7 R, 88.7 B, 85.5 R, 260/85.5 S

[56] References Cited
UNITED STATES PATENTS

| | | | |
|---|---|---|---|
| 2,817,649 | 12/1957 | Contois | 260/88.7 B |
| 2,861,059 | 11/1958 | Mowry et al. | 260/88.7 B |
| 3,200,102 | 8/1965 | Kleiner | 260/88.7 R |
| 3,410,941 | 11/1968 | Dagon et al. | 260/85.5 N |

*Primary Examiner*—Harry Wong, Jr.
*Attorney, Agent, or Firm*—Murray Schaffer

[57] ABSTRACT

Method of manufacturing polycoagulants for water purification is provided comprising polymerizing acrylonitrile in a 50 to 65 percent nitric acid solution at a concentration of between 10 and 20 percent of acrylonitrile by weight. The viscous solution thus obtained is maintained at temperatures between 20° and 45°C until a sample of the polymer, precipitated in water, is soluble in an aqueous alkaline solution at increased temperature. Thereafter, the partly hydrolyzed polymer, containing still a substantial amount of nitrilic groups in addition to the amidic and carboxylic groups, is precipitated in water in diluted nitric acid or in a lower aliphatic alcohol. The isolated copolymer is dissolved in an aqueous alkaline solution.

6 Claims, No Drawings

METHOD OF MANUFACTURING POLYCOAGULANTS

The present invention relates to a method for manufacturing polycoagulents.

Polycoagulants are flocculating agents, capable of precipitating various colloidal impurities, ions and other substances dispersed or dissolved in water. Synthetic polycoagulants are mostly high polymers of acrylamide, or its copolymers with acrylic acid, methacrylamide and other co-monomers. Such water-soluble monomers cannot be subject to emulsion or suspension copolymerization. The use of organic solvents cause chain transfer reaction and thus a reduction of the degree of polymerization compositions having high molecular weights, desirable for the above said purpose, can be obtained only by polymerization in water or in aqueous solutions respectively. The conversion is, however, never complete, and the remaining monomers are highly toxic. Their removal from the product is rather difficult because they are water-soluble just as the resulting copolymer.

It was found that copolymers of acrylonitrile with acrylamide, acrylic acid and possibly with other co-monomers can be prepared without the above mentioned troubles if the acrylonitrile is polymerized in strong nitric acid solution at a concentration from about 10 to about 20 percent of acrylonitrile by weight, the viscous polymer solution thus obtained being kept at 20° – 45°C until an isolated sample is completely soluble in hot diluted alkaline solutions, the polymer solution being then precipitated, for example, by pouring it into water or into diluted nitric acid, or, if desired, into a lower aliphatic alcohol. The washed precipitate is then dissolved in an alkaline solution. The precipitate in water or in alcohol, or in their mixtures respectively, may be separated from the acid liquor by decantation, the remaining acid and water being then removed by means of a lower aliphatic alcohol such as methanol or ethanol.

As alkaline solutions, aqueous sodium bicarbonate, carbonate or hydroxide may be used for example.

Polymerization of acrylonitrile in strong nitric acid solutions (e.g., 55 to 65 percent ic) is advantageously carried out at temperatures between +10° and +20°C, i.e., slightly below the temperatures at which the partial hydrolysis would be carried out. As polymerization catalysts, known inorganic compounds liberating readily free radicals may be used, particularly preferable are persulfates or chlorates of alkali metals or ammonium. Persulfates are preferred. Organic peroxidic compounds may be used as an additive too, they, however, often cause unwanted chain transfer reactions, decreasing the degree of polymerization of the polymer.

At high monomer concentrations, however, a certain degree of chain transfer is desirable in order to avoid cross-linking. If, for instance, a 20 percent acrylonitrile solution in strong nitric acid is polymerized at temperatures below 20°C, cross-linking may be avoided either by using an organic peroxidic initiator of polymerization such as acetone peroxide or di-isopropyl percarbonate, or by adding a suitable chain transfer agent such as urea.

By choosing a proper concentration of such chain-transfer agent, high molecular polymers with moderately branched structure having very long branches may be obtained. These may be particularly suitable for manufacturing polycoagulants.

The polymerization is carried out in known manner under exclusion of oxygen or ambient air.

If the precipitated copolymer, dissolved in alkaline solutions, is kept at pH higher than 7, a part of amidic groups is further hydrolyzed to carboxylic groups. The time required for this subsequent alkaline hydrolysis depends on both temperature and pH value and may be easily determined for any required ratio of said groups in the copolymer. Another way to increase the amount of carboxylic units at the expense of amidic groups is by the treatment of the copolymer with nitrous acid, adding to the solution, for example, sodium nitrite and a mineral acid. This may be done simply by adding sodium nitrite to the bath into which the solution of the polymer in nitric acid is coagulated.

As alkaline solutions, any basic solution with pH value above 7 is meant, e.g., hydroxides of alkali and earth alkali metals or ammonium, or their salts with weak acids such as carbonates, acetates and similar components. Quaternary ammonium bases and their salts may be also used, if desired.

The degree of partial hydrolysis depends on the temperature and time for which the polymer is kept in nitric acid. For instance, a suitable degree of the hydrolysis may be attained by heating the polymer solution in nitric acid 8 – 10 hours at 45°C, or 5 – 12 days at 22°–25°C. The content of nitrilic groups may be controlled for example by infra-red spectroscopy. Temperatures above 45° – 50°C, as well as irradiation of the polymer solutions in strong nitric acid by ultra-violet rays is to be avoided, otherwise the polymer would be oxidized by the nitric acid, and poisonous red nitrous gases would be liberated. This decomposition is auto-catalytically accelerated and may be controlled, in addition to the keeping of the temperature below 50°C, also by the presence of urea or other compounds in which nitrous acid is bound.

The copolymers have not only a branched structure with long branches, but also at least partly a structure with sequences of nitrilic and amidic groups in their chains. The isoelectric point, i.e., the pH value at which the coagulation occurs, may be influenced by the temperature at which the partial hydrolysis is carried out. The lower is the temperature during the partial hydrolysis, the longer are the sequences of single monomer units.

The main advantage of the present process is that acrylamide and acrylic acid are never present as free monomers, so that they need not to be removed. The polycoagulants obtained by the method of the invention are thus free of toxic admixtures and no expensive and time keeping purification is necessary.

Moderate branching with very long branches is caused by chain transfer onto the monomer, resulting in forming three-functional molecules

with two π-electrons and one unpaired electron. Such three-functional molecules are less inclined to cause cross-linking than usual four-functional molecules with two double bonds. The method of the invention makes it possible to obtain completely soluble copolymers with average molecular weight of several millions.

Similar three-functional molecules are formed by decomposition of acrylonitrile hydroperoxide which is always present if the monomer was kept in contact with air or oxygen. Their formula is

Nitrilic groups are capable to form complexes with some metal cations and thus increase the reactivity of the copolymer.

For special purposes, a part of carboxylic groups may be transformed to hydroxamic acid groups by the known reaction with hydroxyl amine.

The polycoagulants according to the invention are particularly suitable for purification of water by means of fluidized cloud of flocks, formed by coagulation of impurities with the polycoagulant, water to be purified streaming upwards through said fluidized cloud acting as a fluid filtering layer.

EXAMPLE 1

84 g of pure, not dried acrylonitrile were dissolved in 616 g of a colorless 65 percent solution of nitric acid, which was previously degassed by leading a stream of carbon dioxide therethrough, or by exposing it for a short time to vacuum of a water jet pump. To the above monomer solution 1 ml of a 5 percent aqueous ammonium persulfate solution was added, and the solution was kept for 7 days at 18°C, access of air being excluded. Then the viscous solution was stirred 4 hours at 41° – 42°C in a water bath. The solution was then precipitated by pouring a thin stream of it into 5 litres of cold water while slowly stirring. The precipitate was decanted, and a surplus of cool anhydrous ethanol was added. The white copolymer was separated, forming a soft mass from which the mother liquor was squeezed out. The copolymer was kept in fresh anhydrous ethanol for several hours, after which it became rather hard and brittle so that it could be disintegrated and filtered off. The copolymer was then dried and heated in water, to which was gradually added sodium bicarbonate until the copolymer contained about 30 mol percent of sodium carboxylate units. The resulting 3 to 4 percent aqueous solution was then used for purification of water containing trivalent iron ions and colloid impurities.

EXAMPLE 2

200 g of acrylonitrile, 800 g of 60 percent nitric acid, 1 g of urea and 1 ml of a 10 percent potassium persulfate aqueous solution were thoroughly mixed and covered by a 10 mm thick layer of white paraffin oil. The mixture was left standing for a week at 16° – 17°C, whereafter the temperature was increased to 22°C for an additional 5 days. The highly viscous, almost gel-like solution was disintegrated to thin flakes in a stream of tap water using a rotating knife. The flakes were washed in water until all nitric acid was removed and then heated in 5 liters of distilled water, gradually adding thereto sodium carbonate till the polymer was completely or almost completely dissolved. The solution thus obtained was suitable as polycoagulant for water purification.

What I claim is:

1. A method of manufacturing a polycoagulant comprising polymerizing 10 to 20 percent by weight of acrylonitrile in a nitric acid solution of about 50 to 65 percent concentration, said polymerization being carried out at a temperature between 10° and 20°C in the presence of an inorganic free radical catalyst, and thereafter subjecting the resultant polymer solution to an increased temperature for a period of time ranging between about 4 – 10 hours at 41° – 50°C and 5 – 12 days at 22° – 25°C sufficient to effect partial acid hydrolysis of said polymer until said polymer forms a polycoagulant completely soluble in an aqueous solution of a weak alkali.

2. The method as set forth in claim 1, wherein the nitric acid solution initially contains 15 to 20 percent of said acrylonitrile by weight together with a small amount of a chain transfer agent sufficient to avoid cross-linking but insufficient to avoid macromolecular branching of the resultant polymer.

3. The method as set forth in claim 2, wherein less than 1 percent by weight of urea is used as said chain transfer agent.

4. The method as set forth in claim 1, wherein the nitric acid solution initially contains 15 to 20 percent of said acrylonitrile by weight together with a small amount of an organic polymerization initiator capable of causing chain transfer.

5. The method as set forth in claim 1, wherein said partially hydrolyzed polycoagulant is precipitated from said nitric acid solution only after an aliquot portion thereof is soluble in a hot aqueous alkaline solution.

6. The method as set forth in claim 5, wherein said partially hydrolyzed polycoagulant is precipitated by pouring said nitric acid solution into water, dilute nitric acid or an aqueous solution of a lower aliphatic alcohol.

* * * * *